US 9,157,456 B2

(12) United States Patent
Potel et al.

(10) Patent No.: US 9,157,456 B2
(45) Date of Patent: Oct. 13, 2015

(54) METHOD FOR MONITORING THE CLEARANCE OF A KINEMATIC LINK BETWEEN A CONTROL MEMBER AND A RECEIVING MEMBER

(71) Applicant: SNECMA, Paris (FR)

(72) Inventors: Nicolas Potel, Moissy-Cramayel Cedex (FR); Hichem Belghagi, Moissy-Cramayel Cedex (FR)

(73) Assignee: SNECMA, Paris (FR)

( * ) Notice: Subject to any disclaimer, the term of this patent is extended or adjusted under 35 U.S.C. 154(b) by 515 days.

(21) Appl. No.: 13/684,432

(22) Filed: Nov. 23, 2012

(65) Prior Publication Data

US 2013/0136575 A1    May 30, 2013

(30) Foreign Application Priority Data

Nov. 24, 2011  (FR) ..................... 11 60771

(51) Int. Cl.
*F01D 17/16* (2006.01)
*F04D 29/56* (2006.01)
*F01D 17/06* (2006.01)
(Continued)

(52) U.S. Cl.
CPC .............. *F04D 29/563* (2013.01); *F01D 17/04* (2013.01); *F01D 17/06* (2013.01); *F01D 17/085* (2013.01); *F01D 17/162* (2013.01);
(Continued)

(58) Field of Classification Search
CPC ....... F01D 17/06; F01D 17/08; F01D 17/085; F01D 17/162; F01D 17/167; F02C 9/22
USPC ......................................................... 415/160
See application file for complete search history.

(56) References Cited

U.S. PATENT DOCUMENTS 7,689,376 B2 *  3/2010  Padhye et al. ................. 702/100
7,855,525 B2 * 12/2010  Sanders et al. ................ 318/466
(Continued)

FOREIGN PATENT DOCUMENTS

| EP | 2 067 957 A2 | 6/2009 |
| EP | 2 383 439 A2 | 11/2011 |
| FR | 2 947 310 | 12/2010 |

OTHER PUBLICATIONS

French Preliminary Search Report and Written Opinion issued Jun. 21, 2012 in corresponding French Application No. 11 60771 filed on Nov. 24, 2011 (with an English Translation of Categories).

*Primary Examiner* — Ninh H Nguyen
(74) *Attorney, Agent, or Firm* — Oblon, McClelland, Maier & Neustadt, L.L.P.

(57) ABSTRACT

The method consists, based on an operating parameter of the turbojet engine, in:
  displacing said control member (11) in a direction as far as a first position (P1) for which the receiving members (5) are rotated so as to take up the clearance of the kinematic link (12),
  then displacing said control member in the direction opposing the previous direction, as far as a second position (P2) when a variation of the selected operating parameter is observed, and in ascertaining the travel of the control member (11) between the two positions corresponding to the total clearance of the kinematic link (12), and
  comparing the ascertained value of said travel of the control member with a predetermined limit value and, if it is observed that the ascertained value of the travel of the control member is greater than said limit value, to carry out monitoring of the kinematic link (12).

6 Claims, 2 Drawing Sheets

(51) Int. Cl.
  *F01D 17/04* (2006.01)
  *F01D 17/08* (2006.01)
  *F02C 9/22* (2006.01)
  *F01D 21/00* (2006.01)

(52) U.S. Cl.
  CPC ............... *F01D 21/003* (2013.01); *F02C 9/22* (2013.01); *F05D 2260/80* (2013.01)

(56) References Cited

U.S. PATENT DOCUMENTS

| | | | |
|---|---|---|---|
| 8,690,521 B2* | 4/2014 | Colotte et al. | 415/36 |
| 8,770,912 B2* | 7/2014 | Minto et al. | 415/1 |
| 2009/0123272 A1 | 5/2009 | Love et al. | |
| 2011/0268554 A1 | 11/2011 | Minto et al. | |
| 2012/0107088 A1 | 5/2012 | Gaully et al. | |

* cited by examiner

METHOD FOR MONITORING THE CLEARANCE OF A KINEMATIC LINK BETWEEN A CONTROL MEMBER AND A RECEIVING MEMBER

The present invention relates to the field of turbomachines such as aircraft turbojet engines and, more particularly, to a method for monitoring the clearance of a kinematic link between a control member such as an actuating cylinder and one or more receiving members of the turbomachine, such as blades of the stator of a high pressure compressor which are able to be oriented.

It is known that, in an aircraft turbojet engine, the high pressure compressor comprises blade stages forming the stator of the compressor and which alternate with blade stages forming, in turn, the rotor of the compressor. To optimize the circulation of air passing through said compressor as a function of the operating speed, the blades of the stator, although fixed in rotation relative to the longitudinal axis of the turbojet engine, have variable spacing or pitch so as to be able to be oriented relative to radial axes, perpendicular to the longitudinal axis of the turbojet engine.

To achieve this object, a kinematic link is provided between a control member such as an actuator or linear actuating cylinder and the receiving members such as the stator blades to be oriented. Said kinematic link, which is essentially mechanical, is relatively complex since it consists of numerous parts which are articulated to one another to transmit the travel or path of the displacement in translation of the actuator into a pivoting of the blades about their respective axes.

One embodiment of such a known kinematic link is shown in FIGS. 1 and 2 and is described hereinafter, after the introduction to said figures.

Thus, with reference to said example, the adjustment of the angular position of the blades of the stator is a function of the linear travel of the actuating cylinder such that a relation exists between said travel and the orientation of the blades, i.e. a specific (planar) position of the stator in the turbojet engine, a given pressure and a given acceleration/deceleration (and thus a rotational speed) correspond to a given angle of the blades. So as to ensure reliable and correct operation according to safety standards in the aeronautical field, when initially mounting the kinematic link and during maintenance operations, the travel of the actuating cylinder is adjusted as finely as possible, relative to the mobile blades, since it is the actuating cylinder which is controlled. Thus, the clearance of the kinematic system from the actuating cylinder to the blades, via the different parts, constitutes a difference in position relative to the above theoretical relation of the spacing of the blade assemblies.

Dead travel of the actuating cylinder is thus present before the actual orientation of the blades by the presence of the operational clearance of the kinematic system (including the different clearances between the parts). If said clearance is far too high, this may have serious consequences. More specifically, for such a compressor with stator blades with variable spacing, a clearance which is too high, for example as a result of wear of the sockets for retaining the blades, is not currently detected, nor is it able to be detected. In this manner, the stator blades may thus be offset at an angle and come into frictional contact with the rotor blades, which may result in a serious incident and destruction of the compressor.

Moreover, according to a law which relates the angle of the blades to the position of the stator, and as the position of the actuating cylinder is subjected to pressure and acceleration/deceleration, said position oscillates about its set position with an oscillation amplitude which is less than the kinematic clearances and thus has no effect on the angular position of the blades. Said oscillation causes unnecessary wear of the different parts of the kinematic system in addition to the parts making up the actuating cylinder.

Currently, the monitoring of the clearance between the control member and the receiving members is carried out by performing a visual inspection of the state of the actuating cylinders and the kinematic link which is a lengthy and complicated operation requiring the stoppage of the engine, to assess the state of the "actuating cylinder-kinematic link-blade" assembly. More specifically, it is not easy to access the confined areas of the engine including said kinematic systems and requires a significant operation time. Moreover, an estimated measurement of the clearance is not determined during said inspections. If, during an inspection, it is judged that the clearance may lead to malfunctioning, then adjustment operations are carried out on the relevant parts with the replacement thereof if required.

The object of the present invention is to remedy said drawbacks and the invention relates to a method making it possible to monitor the clearance of the kinematic link without having recourse to a lengthy immobilization of the engine and to awkward servicing operations.

To this end, the method for monitoring the clearance of a kinematic link between a control member such as a linear actuator and receiving members of a turbomachine, such as the blades of a stator with variable spacing of a compressor, is noteworthy according to the invention in that it consists, based on an operating parameter of the turbomachine, in:

displacing said control member in a direction as far as a first position for which the receiving members are rotated so as to take up the clearance of the kinematic link, then displacing said control member in the direction opposing the previous direction, as far as a second position when a variation of the selected operating parameter is observed, and in ascertaining the travel of the control member between the two positions corresponding substantially to the total clearance of the kinematic link, and comparing the ascertained value of said travel of the control member between the two positions with a predetermined limit value and, if it is observed that the ascertained value of the travel of the control member is greater than said predetermined limit value, to carry out an inspection of the kinematic link.

Thus, by means of the invention, the clearance is monitored by simple linear displacements of the control member, such as the actuator, respectively a forward displacement, taking up the clearance to act directly on the receiving members such as the blades, and a return displacement until the value of the selected operating parameter is varied, from the travel corresponding to the total clearance produced. In addition, if, during the implementation of the method by ground testing the engine concerned and by varying the operating parameter of the engine, a value of the travel of the actuator between the two positions is ascertained which is beyond the predetermined limit value, it is deduced therefrom that this results from too much clearance in the kinematic chain. It is then necessary, but only at that moment, to inspect visually the kinematic link, including the control member, and to carry out mechanical interventions thereon.

In contrast, if the value of the travel of the control member is less than the predetermined limit value, the clearance is considered as acceptable and as not requiring intervention.

Thus it is concluded that the implementation of the method for monitoring the clearance is particularly rapid and reliable by a simple operation of the control member and the turbojet engine, without dismantling said engine and without recourse to additional tools, which reduces the maintenance costs. It is also observed that the monitoring method ultimately does not require a direct measurement of the clearance, the variation of the value of the parameter under consideration being sufficient to permit the comparison of the travel of the control member corresponding to the clearance of the kinematic link with a reference travel.

For example, it is possible to select the rotational speed of the compressor with the variable blade assembly as an operating parameter of the turbojet engine. Thus, in this case, from the onset of a change to the rotational speed of the compressor, a variation which has to be defined in advance, the return travel of the linear actuator to the second position is stopped and the value of the travel between the two positions corresponding substantially to the total clearance of the kinematic system is ascertained and then compared.

As the value of said operating parameter, it is estimated that the second position of the travel of the control member is reached when the variation in the rotational speed is in the order of 100 r/min.

Further examples of parameters in terms of operating parameters of the turbojet engine may be selected and may relate to the pressure of the air circulating in the compressor with the variable blade assembly or the temperature of the exhaust gases.

Advantageously, the steps of the method are repeated according to an established timescale corresponding to a specific number of flights of an aircraft provided with turbojet engines.

The figures of the accompanying drawing will aid the understanding of how the invention may be implemented. Identical reference numerals denote similar elements in said figures.

Figure 1:
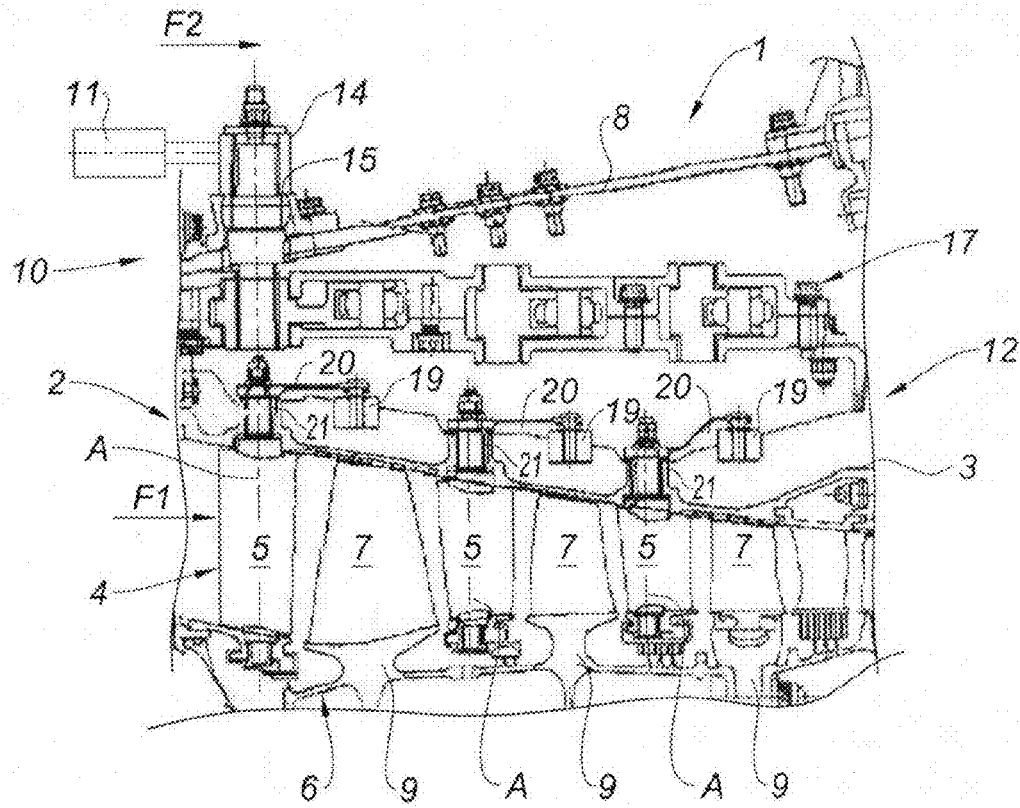
FIG. 1 shows a partial and schematic longitudinal section of a turbojet engine of an aircraft showing, in particular, the high pressure compressor with its rotor with rotating blades and its stator with fixed blades, with variable spacing, and the kinematic link controlling said blades.

The turbojet engine 1 shown partially in FIG. 1, such as a double-flow turbojet engine for an aircraft, shows the high pressure compressor 2 comprising, in the usual manner, fixed to the casing 3 thereof, the stator stages 4 with the blades 5 thereof at variable spacing, and therebetween, the rotor stages 6 with the rotating blades 7 thereof. The primary flow F1 of the air entering the turbojet engine 1 passes through the successive and alternate stages of the rotor 6 and the stator 4 of the compressor, whilst the secondary flow F2 passes through the turbojet engine between an intermediate casing 8 surrounding the compressor and an external casing, not visible in the figures, of the turbojet engine. The stator 2 constitutes the fixed part that the primary flow of air passes through.

The blades 7 of the rotor 6 are connected together by platforms 9 and are arranged so as to rotate, during the operation of the turbojet engine 1, between the blades 5 of the stator 4 which are fixed in rotation relative to the blades 6 of the rotor but may be rotated about their own axis A, i.e. radially relative to the axis of rotation of the blades of the rotor, corresponding to the longitudinal axis, not visible in FIG. 1, of the turbojet engine 1.

To enable the orientation or the spacing of the blades 5 of the stator 4 to be adjusted and thus to optimize the passage of the primary flow of air F1 through the compressor 2 as a function of the operating speed of the turbojet engine and thus the flight phases of the aircraft, said blades 5 are controlled by a mechanical system 10 provided between the intermediate casing 8 and the casing 3 of the compressor to which the stator stages are associated.

Figure 2:
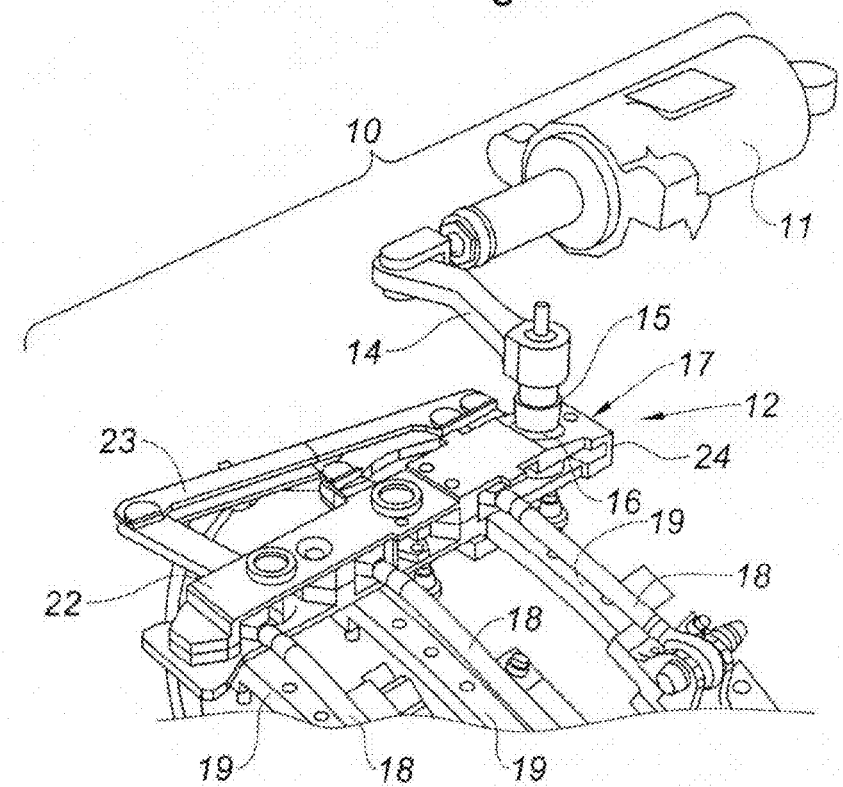
FIG. 2 is a perspective view of the kinematic link controlling the blades with variable spacing of the stator.
Figure 3:
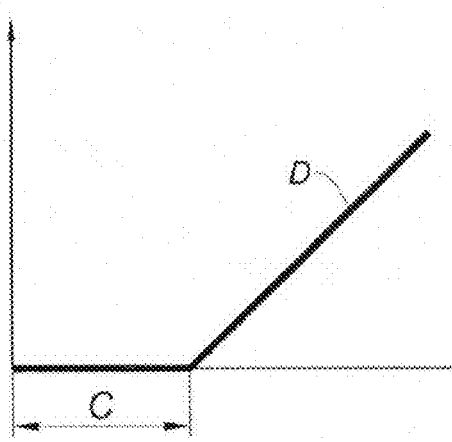
FIG. 3 is a graph showing the rotation of the stator blades as a function of the displacement path of the engine member, including the operational clearance of the kinematic link.

The system 10 illustrated in FIGS. 2 and 3 comprises a control member 11 such as an actuator or linear actuating cylinder, and a kinematic link 12 connecting the control member 11 to the stator blades 5 which serve as receiving members.

Said kinematic link 12, known per se, comprises a plurality of parts connected together and in particular, starting from the actuating cylinder, a control lever 14, a control shaft 15, a cylindrical transmission element 16 and a transmission structure 17 onto which is mounted a plurality of actuating links 18 connected to respective control rings 19 of the blades 5, each of the rings 19 being connected via an orientation lever 20 to the blades 5 of the stator 4, of which the feet are received in connecting sockets 21 housed in the casing 3.

The transmission structure 17 to the blades 5 of the stator 4 in turn comprises a plurality of parts such as, in particular, a base 22 in which links 23 are articulated for transmitting force to the actuating links 18 fixed to the control rings 19, and a support plate 24 receiving the control shaft 15 by a ball joint to retain the control shaft in the plate 24 and permit the rotation of the shaft 15 therein.

Thus, the actuation of the control actuating cylinder 11 causes the displacement of the entire kinematic link 12 of the system 10 to the receiving members, i.e. the orientation of the blades 5 of the stator 4 about their axis A.

In particular, as FIGS. 1 and 2 show, the rotation of the control lever 14, displaced by the actuating cylinder 11, causes the rotation of the control shaft 15, then the rotation of the cylindrical transmission element 16 which then transmits the control force received by the control shaft 15, in this case by the connecting rod system 23, to each actuating link 18, the displacement thereof driving the ring 19 to which it is connected in rotation. In one stage, each blade 5 is connected to the ring 19 by the orientation lever 20 such that the rotation of the ring 19 causes the displacement of the orientation levers 20 in rotation, said rotation permitting the angular orientation of the blades 5 in the sockets 21 relative to the primary flow F1.

As mentioned above, to carry out such a function, operational clearances are defined between the different parts of said transmission system 10 composed of the actuating cylinder 11, the kinematic link 12 and the blades 5.

To monitor the total clearance between the actuating cylinder 11 and the blades 5 and to prevent it from becoming too great and causing malfunctions of the compressor 2, as those mentioned above, the method of the invention is implemented.

The graph of FIG. 3 shows the dead travel C of the rod of the actuating cylinder 11 before the rotation of the blades 5 is produced about the axes A, said dead travel to a certain extent taking up the various clearances of the parts making up the kinematic link 12 from the actuating cylinder 11 to the blades 5. Thus, the travel C of the actuating cylinder is seen on the abscissa of the graph, during which the rotation of the stator blades 5, shown on the ordinate, is zero, no rotation being produced. In addition, as soon as the clearances are taken up after this travel C, the displacement path of the actuating cylinder 11 continues and proportionally causes, along a straight line D, the angular orientation of the blades 5 according to the established law as specified above.

Thus the importance is understood of the method of the invention consisting in monitoring the clearance of the kinematic link 12 based on the value of the dead travel of the actuating cylinder relative to an acceptable limit value thereof, to determine subsequently if there is a need to take action or not on the kinematic system itself.

Figure 4:
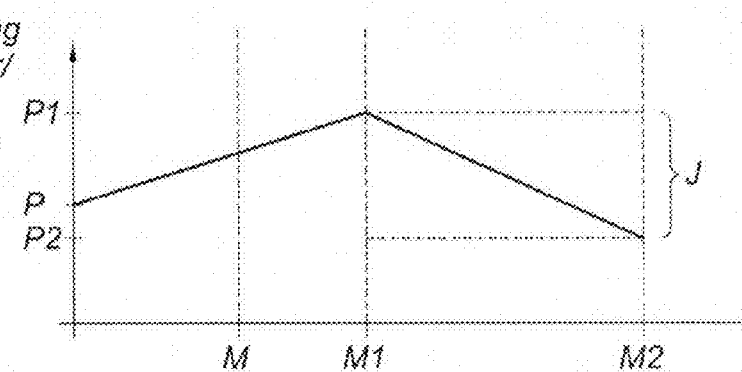
FIGS. 4, 5 and 6 are graphs showing the implementation of the method according to the invention, respectively according to the position of the engine member, the position of the receiving members and the rotational speed of the engine.

To achieve this, the implementation of the monitoring method will be described hereinafter with regard to FIGS. 4, 5 and 6, which method may be implemented when the aircraft is grounded, without recourse to specific related installations. More specifically, as FIG. 4 shows, it is necessary to displace the rod of the linear actuating cylinder 11 (control member) from any initial position P which the actuating cylinder occupies to a first position P1 where it is certain that the blades 5 of variable spacing of the stator 4 have been rotated, i.e. a rotation thereof about their radial axis A has indeed taken place. The clearance of the kinematic system 12 which is thus present between the initial position P and the first position P1 has thus been taken up, since the rotation of the blades 5 is achieved whatever the angular variation implemented, said angular variation simply having to be effective.

To verify this, whilst the turbojet engine 1 rotates at a given rotational speed corresponding to a flight point of the aircraft (cruising for example), which is thus reproduced on the ground, it is known that an increase in the rotational speed of the compressor corresponds to a given angular displacement of the blades and thus to a change in the spacing thereof. For example, an increase in the speed of 400 r/min corresponds to a rotation of 5°.

Thus, when a speed increase is observed (or even a speed reduction, with a reverse rotation as a result of the opposing travel of the actuating cylinder), whether it is of this type or different, this signifies that the blades 5 of the stator 4 must have rotated which is the object of said displacement of the actuating cylinder 11 into said first position P1 in FIG. 4.

Figure 5:
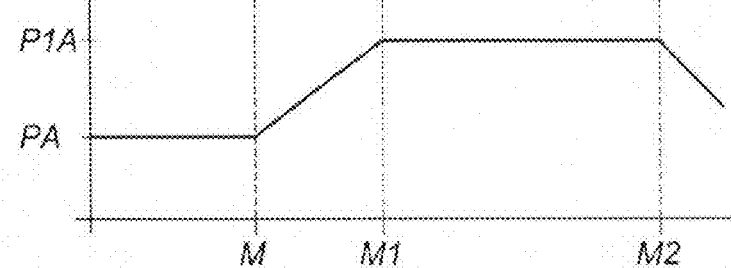

At the same time as the travel of the actuating cylinder, FIG. 4, the position or the angular orientation PA of the blades, FIG. 5, at the start of the displacement of the actuating cylinder, has not changed due to the clearance present in the kinematic link or transmission link, until the moment M when, the clearance being taken up, the blades 5 have started to rotate until they reach a given angular orientation PA1 at the moment M1, corresponding to the position P1 of the actuating cylinder at that moment. Similarly, the rotational speed R, FIG. 6, does not change as long as the clearance has not been taken up, and starts to increase at the moment M, subsequently to reach the given speed R1 at the moment M1, corresponding to the orientation adopted by the blades 5 when the actuating cylinder 11 is in the first position P1.

Then, as the actuating cylinder is in its first position P1 (PA1 for the blades and R1 for the rotational speed) said linear actuating cylinder 11 is controlled to displace it in the direction opposing the previous direction until it occupies a second position P2 for which a variation in the rotational speed of the compressor is observed. This means that the reverse displacement path until the moment M2 where the speed starts to change, substantially constitutes the total clearance J, FIG. 4, of the kinematic link 12 before "acting" on the orientation of the blades, i.e. it corresponds to the dead travel of the actuating cylinder, shown at C in FIG. 3. The actuating cylinder 11 then occupies its second position P2.

Figure 6:
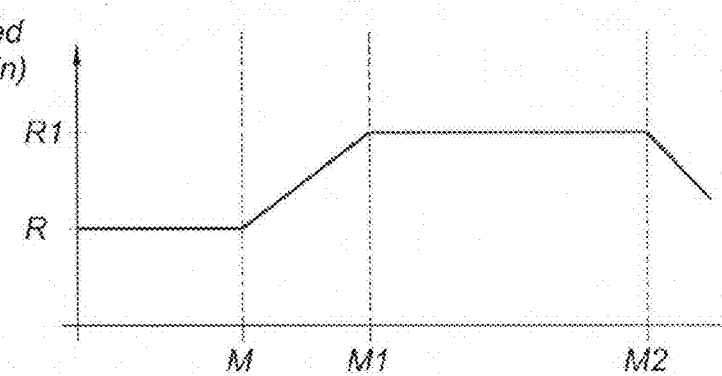

During this reverse displacement of the actuating cylinder 11, the orientation PA1 of the blades 5 and the rotational speed R1 of the compressor 2 have not changed and remain in plateaux as FIGS. 5 and 6 show, until the moment M2 where the variation of the speed of the compressor is detected, from the start of the orientation of the blades. Said variation naturally has to be minimal to be certain that it corresponds to the desired clearance, and it is estimated that a variation in the speed of 100 r/min is an acceptable value for the total take-up of the clearance J without causing a significant orientation of the blades 5 of the stator 4.

The estimated measurement of the travel of the actuating cylinder between its two positions P1 and P2 is deduced from this displacement to and fro of the actuating cylinder 11, therefore, namely a measurement which corresponds to the total clearance J of the kinematic link 12 by taking the rotational speed of the compressor as the operating parameter of the turbojet engine 1, in this example for implementing the method.

Based on this, the method consists in comparing the value of this ascertained measurement with a limit reference value previously determined by calculation and, if said ascertained measured value is beyond the theoretically admissible limit value, then a visual inspection of the kinematic link 12 is carried out and if required, an intervention with adjustments and potentially the replacement of the relevant parts of the transmission.

Naturally, if the measured value is less than the limit value, no inspection or intervention is required, meaning that the kinematic link is operational. It is possible to observe the ease with which said kinematic system may be monitored without recourse to dismantling the turbojet engine, with the resulting loss of time, or any direct measurement of the clearance in the region of said parts and thus any specific equipment, resulting in a saving of time and costs.

Moreover, such a method for monitoring may be programmed regularly, for preventative purposes, after a certain number of flights of the aircraft, so as to be able to monitor said kinematic link ultimately over the entire life of the aircraft.

In this example for implementing the method, the clearance of the kinematic link is monitored between the actuating cylinder and the blades based on the rotational speed of the compressor in order to deduce therefrom the desired clearance, by measuring the difference in the position of the actuating cylinder P1 and P2, and then to compare said clearance with a limit value.

As a variant, it is possible to select, as further operating parameters of the turbojet engine, the pressure circulating in the compressor, the temperature of the exhaust gases, etc. and generally any parameter which varies with the orientation of the blades with variable spacing and thus with the displacement of the control actuating cylinder.

The invention claimed is:

1. A method for monitoring the clearance of a kinematic link between a control member and receiving members of a turbomachine, the operation of the turbomachine depending of at least one operating parameter,
wherein said method comprises the steps of:
displacing said control member in a direction as far as a first position for which the receiving members are rotated so as to take up the clearance of the kinematic link,
then displacing said control member in the direction opposing the previous direction, as far as a second position when a variation of said operating parameter is observed, and ascertaining the travel of the control member between the two positions corresponding substantially to the total clearance of the kinematic link, and comparing the ascertained value of said travel of the control member between the two positions with a predetermined limit value and, when it is observed that the ascertained value of the travel of the control member is greater than said predetermined limit value, monitoring the kinematic link.

2. The method as claimed in claim 1, in which the steps are repeated according to an established timescale corresponding to a number of flights of an aircraft provided with turbojet engines.

3. The method as claimed in claim 1, wherein the control member is a linear actuating cylinder and the receiving members are blades of a stator with variable spacing of a compressor, and wherein a rotational speed of the compressor is the operating parameter of the turbomachine.

4. The method as claimed in claim 3, wherein the second position of the travel of the control member is estimated to be reached when the variation in the rotational speed is in the order of 100 r/min.

5. The method as claimed in claim 1, wherein the control member is a linear actuating cylinder and the receiving members are blades of a stator with variable spacing of a compressor, and wherein an air pressure circulating in the compressor with the variable blade assembly is the operating parameter of the turbomachine.

6. The method as claimed in claim 1, wherein the control member is a linear actuating cylinder and the receiving members are blades of a stator with variable spacing of a compressor, and wherein a temperature of exhaust gases is the operating parameter of the turbomachine.

* * * * *